United States Patent
Hodde (10) Patent No.: US 10,583,566 B2
(45) Date of Patent: Mar. 10, 2020

(54) TRANSPORT DEVICE AND TRANSPORT METHOD FOR TRANSPORTING A SEMI-FINISHED PRODUCT AND PROCESSING DEVICE FOR PROCESSING A SEMI-FINISHED PRODUCT

(71) Applicant: Bayerische Motoren Werke Aktiengesellschaft, Munich (DE)

(72) Inventor: Jan Hodde, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 479 days.

(21) Appl. No.: 15/344,940

(22) Filed: Nov. 7, 2016

(65) Prior Publication Data
US 2017/0050342 A1    Feb. 23, 2017

Related U.S. Application Data

(63) Continuation of application No. PCT/EP2015/058544, filed on Apr. 21, 2015.

(30) Foreign Application Priority Data

May 9, 2014 (DE) .................. 10 2014 208 705

(51) Int. Cl.
*B25J 15/08* (2006.01)
*B25J 15/00* (2006.01)

(52) U.S. Cl.
CPC ......... *B25J 15/0014* (2013.01); *B25J 15/009* (2013.01); *B25J 15/08* (2013.01)

(58) Field of Classification Search
CPC ........ B29C 31/08; B29C 70/541; B25J 15/08; B25J 15/0014; B25J 15/009; B29K 2105/0872
See application file for complete search history.

(56) References Cited

U.S. PATENT DOCUMENTS 3,559,371 A * 2/1971 Borrowman ............ B65B 23/02
294/81.52
4,805,949 A    2/1989 Conway
(Continued)

FOREIGN PATENT DOCUMENTS

CN    100384614 C    4/2008
CN    102105232 A    6/2011
(Continued)

OTHER PUBLICATIONS

Chinese-language Office Action issued in counterpart Chinese Application No. 201580007620.0 dated Jan. 9, 2018 with English translation (Nineteen (19) pages).

(Continued)

*Primary Examiner* — Michael S Lowe
(74) *Attorney, Agent, or Firm* — Crowell & Moring LLP (57) ABSTRACT

A transport device, a transport method for transporting a semi-finished product, and a processing device for processing a semi-finished product are provided. The transport device has at least one positioning device for positioning the semi-finished product in relation to the transport device and at least one retaining device for retaining the semi-finished product on the transport device. The positioning device can be inserted into an engagement region of the semi-finished product at least in some segments and the retaining device can be arranged on a surface of the semi-finished product at least in some segments.

10 Claims, 5 Drawing Sheets

(56) References Cited

U.S. PATENT DOCUMENTS

| | | | |
|---|---|---|---|
| 5,746,964 A | | 5/1998 | Ureshino et al. |
| 8,570,058 B2 * | | 10/2013 | Na ............... G01R 31/2867 |
| | | | 324/750.19 |
| 9,242,381 B2 * | | 1/2016 | Kramer ............. B25J 15/0009 |
| 2004/0047940 A1 | | 3/2004 | Zoppas |
| 2010/0243152 A1 | | 9/2010 | Helfrich et al. |
| 2011/0086175 A1 | | 4/2011 | Dey et al. |
| 2015/0123415 A1 | | 5/2015 | Kraemer et al. |

FOREIGN PATENT DOCUMENTS

| | | |
|---|---|---|
| DE | 33 31 093 A1 | 3/1985 |
| DE | 40 21 786 A1 | 3/1991 |
| DE | 10 2005 001 703 A1 | 2/2006 |
| DE | 10 2007 026 099 A1 | 12/2008 |
| DE | 10 2011 050 102 A1 | 11/2012 |
| DE | 10 2012 019 958 A1 | 4/2013 |
| DE | 10 2012 020 554 A1 | 4/2014 |
| EP | 0312874 A3 | 4/1989 |
| EP | 2 716 585 A2 | 4/2014 |
| FR | 2997032 A1 | 4/2014 |
| WO | WO 96/23594 A1 | 8/1996 |
| WO | WO 2013/186219 A1 | 12/2013 |

OTHER PUBLICATIONS

Chinese-language Office Action issued in counterpart Chinese Application No. 201580007620.0 dated Apr. 14, 2017 with English translation (twenty-three (23) pages).

International Search Report (PCT/ISA/210) issued in PCT Application PCT/EP2015/058544 dated Jul. 15, 2015, with English translation (six (6) pages).

German-language Written Opinion(PCT/ISA/237) issued in PCT Application PCT/EP2015/058544 dated Jul. 15, 2015 (seven (7) pages).

German Search Report issued in counterpart German Application No. 10 2014 208 705.8 dated May 13, 2015, with partial English translation (eleven (11) pages).

* cited by examiner

TRANSPORT DEVICE AND TRANSPORT METHOD FOR TRANSPORTING A SEMI-FINISHED PRODUCT AND PROCESSING DEVICE FOR PROCESSING A SEMI-FINISHED PRODUCT

CROSS REFERENCE TO RELATED APPLICATIONS

This application is a continuation of PCT International Application No. PCT/EP2015/058544, filed Apr. 21, 2015, which claims priority under 35 U.S.C. § 119 from German Patent Application No. 10 2014 208 705.8, filed May 9, 2014, the entire disclosures of which are herein expressly incorporated by reference.

BACKGROUND AND SUMMARY OF THE INVENTION

The present invention relates to a transport device for transporting a semifinished product and to a processing device for processing this semifinished product. The present invention further relates to a semifinished product manufacturing plant for manufacturing a semifinished product and to a transport method for receiving, transporting and depositing a semifinished product.

It is fundamentally known that, for the handling of semifinished products, such as, in particular, impregnated semifinished products, and in particular impregnated semi-finished fiber products, grippers, for example, are used. These grippers clamp the semifinished product by its marginal region and are hence referred to as clamping grippers. With grippers of this type, it is disadvantageously not possible, however, to keep the position of the semifinished product precise and stable, at least during the transport of the semifinished product from, for example, a first processing device to a second processing device. In particular, the semi-finished product can slip during the transport. Furthermore, so-called needle grippers are fundamentally known, which are used to receive and transport the semifinished product, though, particularly due to a high intrinsic weight of the semifinished product, the latter can slip out of the needle grippers. Furthermore, with the fundamentally known gripping systems it is not possible, particularly in a region of a resin coating of the semifinished product in which the impregnating agent, e.g. impregnating resin, is applied to the semifinished product, to grip the semifinished product.

Impregnated semifinished fiber products are used, in particular, in aircraft construction, in aerospace, and also in vehicle construction, and, as is known, are referred to as prepregs. Prepregs are primarily flat, planar fibrous structures, which in a continuous process are impregnated with a matrix system in the desired resin-fiber ratio. Essentially there are two known textile structures, such as, for example, the unidirectional prepreg, in which all fibers are aligned parallel in the layer, and, on the other hand, fabric prepregs having a number of very different fabric types.

As is known, the industrial manufacture of impregnated fiber composite semifinished products is realized by hand lay-up in a wet pressing process, in a prepreg pressing process or in a resin infusion process, such as, for example, the Resin Transfer Molding (RTM) process. In all above-stated processes, a semifinished fiber product consisting of, for example, synthetic fibers is inserted into an impregnating tool, and in particular an impregnating device, and impregnated or sprayed with an impregnating agent, such as, for example, an impregnating resin, wherein the impregnating agent penetrates through the cavities between the fibers and encases the latter.

Following the impregnation process, the semifinished fiber product impregnated with the impregnating agent is inserted into an appropriate forming tool for the pressing of the semifinished product, which can also be referred to as a consolidation device. During this pressing process, in particular the structure of the impregnated semifinished fiber product is interlaced and the semifinished product shaped. In order to enable transport of the semifinished product to be processed, and in particular of the semifinished product impregnated with the impregnating resin, to the consolidation device, it is necessary to receive the semifinished product by means of a transport device and to transport it out of the impregnating tool to the consolidation tool and transfer it to the latter. For this purpose, a precise take-up and depositing is necessary, which cannot, however, be realized with the previously stated grippers.

The object of the present invention is therefore to at least partially remedy the previously described drawbacks associated with a transport device for transporting a semifinished product, and with a processing device for processing a semifinished product and a semifinished product manufacturing plant for manufacturing a semifinished product. In particular, the object of the present invention is to provide a transport device for transporting a semifinished product, a processing device for processing a semifinished product, a semifinished product manufacturing plant for manufacturing a semifinished product, and a transport method for transporting the semifinished product, by which a precise take-up of the semifinished product from a processing device, a secure and slip-free transportation of the semifinished product to a further processing device, and a precise depositing of the semifinished product in the further processing device can be enabled in a simple and cost-effective manner.

The above object is achieved by a transport device for transporting a semifinished product, and by a processing device for processing the semifinished product, in accordance with embodiments of the invention. In addition, the above object is achieved by a semifinished product manufacturing plant for manufacturing a semifinished product, and a transport method for receiving, transporting and depositing a semifinished product, in accordance with embodiments of the invention. Features and details which are described in connection with the transport device here also naturally apply in connection with the processing device according to the invention, the semifinished product manufacturing plant according to the invention, and/or the transport method according to the invention, and in each case conversely, so that, with respect to the disclosure, reference is or can be always reciprocally made to the individual aspects of the invention. Moreover, in the transport method according to the invention, the transport device according to the invention and/or the processing device according to the invention can be used.

The transport device according to the invention for transporting a semifinished product, the transport device being a component part of a semifinished product manufacturing plant, has at least one positioning device, for positioning the semifinished product relative to the transport device, and at least one retaining device, for holding the semifinished product on the transport device. According to the invention, the positioning device can be introduced, at least in some sections, into an engagement region of the semifinished product and the retaining device can be arranged, at least in some sections, on a surface of the semifinished product.

Advantageously, the semifinished product is an impregnated semifinished product, and in particular an impregnated semifinished fiber product, wherein it is also contemplated that the semifinished product having a tape-laid component, for example, a thermosetting and/or a thermoplastic material. The semifinished fiber product to be impregnated in an impregnating device is, for example, a textile semifinished product having a fabric consisting, for example, of two mutually right-angled fiber directions, also termed warp or weft. For example, the semifinished fiber product has as the used fabric type a linen weave, a body weave, a satin weave and/or a unidirectional fabric. It is also possible, however, that, instead of the fabric, unidirectional bands are used. A semifinished product can also be understood, within the scope of the invention, to be a not yet impregnated component, such as, for example, a prepreg, which can have, for example, continuous fibers and an uncured thermosetting plastics matrix. Semifinished products of this type, and in particular semifinished products which have been impregnated or preimpregnated in this way, are used in vehicle construction as truck lids, engine hoods, interior paneling and/or comparable components. Serving as the matrix of the impregnated semifinished product are, for example, epoxy resins or polyester resins, while as the fibers can be used, for example, glass fibers in the form of mats or fabrics, as well as aramid and carbon filament fabrics. The semifinished products to be transported have, for example, a constant thickness or projections, recesses, undercuts and/or comparable features. Consequently it is possible that the semifinished products have, at least in some sections, material reinforcements, whereby thickness differences are produced in the semifinished product. The transport device according to the invention hence advantageously serves to precisely receive the semifinished product, to transport it without damage, and also to redeposit it precisely in an appropriate processing device.

Responsible for the precise take-up and depositing of the semifinished product from or in a processing device is advantageously the positioning device, which serves to position the semifinished product relative to the transport device itself, and consequently also relative to the processing device. The positioning device is, for example, a positioning pin, which, advantageously in the form of a cylinder, advantageously extends in a vertical direction and, at least in some sections, engages in engagement regions or in an engagement region of the semifinished product. Within the scope of the invention, it is also contemplated, however, that the positioning device can have any other geometric design or a positioning pin and is hence designed also in the form, in cross-section, of a cuboid, rectangular or oval rod. It is additionally contemplated that the positioning device extends substantially, at least in some sections, in a horizontal direction or plane, and hence engages or is introduced not in regions of the upper surface of the semifinished product, but on the lateral surfaces or walls of the semifinished product. Within the scope of the invention, the horizontal plane here extends substantially along a support surface of the processing device(s), onto which the semifinished product is placed or arranged, so that the vertical direction or plane hence extends, within the scope of the invention, substantially perpendicular to this support surface. The engagement region of the semifinished product is, in particular, a recess or a cutout, depression or bore, such as, in particular, a through bore. The at least one engagement region, wherein the semifinished product can also have more than one engagement region and advantageously two or more engagement regions, can be directly introduced, for example, in a portion of the semifinished product, or in some sections of an additional material which is detachably or non-detachably affixed to the semifinished product. Advantageously, the transport device itself has more than one positioning device and advantageously two or more positioning device, which are arranged, for example, at an equal distance apart, so that a reliable and simple positioning of the semifinished product is ensured.

In addition to the positioning device, the transport device according to the invention also has a retaining device for holding the semifinished product, wherein the retaining device can be designed, for example, in the form of a gripping element, and in particular a gripping arm, a lifting mast, a retaining pin, a barb or a pivot arm or similar. Advantageously, the retaining device can be arranged in a region of the semifinished product in which the semifinished product can be undergripped in order to be able to allow raising of the semifinished product for take-up and transportation. In this case, the retaining device is disposed, for example, in a region of a surface of the semifinished product, wherein the surface is, for example, a component part of a support surface by which the semifinished product, at least in some sections, enters into contact with a locating surface of a processing tool or of a processing device. Advantageously, this surface, and in particular the support surface, lie opposite a coating surface or application surface of the semifinished product, to which, in particular within an impregnating device, the impregnating agent, such as, in particular, the impregnating resin, is applied in order to impregnate the semifinished product. The support surface is hence, in particular, a lower surface of the semifinished product.

Within the scope of the invention, it is additionally conceivable that the retaining device is configured such that it is movable relative to the positioning device. Advantageously, the retaining device is designed to be movable in three degrees of freedom and can advantageously move translatorily in the x, y and z directions and also execute a rotary movement about the x, y or z axis. The movement of the retaining device itself is limited merely by the arrangement thereof in the region of the transport device.

The retaining device can be arranged, at least in some sections, in a cutout of the positioning device. That means that the positioning device itself has a recess or a cutout within which the retaining device is introduced such that a penetration of the positioning device through the engagement region of the semifinished product can be enabled without the retaining device adversely interacting with the semifinished product. Hence the retaining device can be arranged in a space-saving or compact manner in the cutout of the positioning device, at least insofar as a holding and transportation of the semifinished product by means of the retaining device is not yet necessary. This means that the positioning device can be introduced, with hence a retaining device arranged within the cutout, into the engagement regions or into the engagement region of the semifinished product and, when the raising or transport of the semifinished product is necessary, can be pushed out or turned out or moved out of the cutout of the positioning device in such a way that the retaining device makes contact with at least a portion in a region of a surface of the semifinished product, whereupon the semifinished product is undergripped with the retaining device such that raising of the semifinished product by means of the transport device can be ensured.

The retaining device can be arranged on a lower surface of the positioning device or is arranged to enable the raising and transport of the semifinished product. The lower surface of the positioning device is here, in particular, the surface which penetrates through the engagement region of the semifinished product in order to be able to ensure that the retaining device can be withdrawn from or swung up out of a region of the positioning device on a surface of the semifinished product in order to receive and raise the semifinished product. The lower surface of the positioning device is hence arranged opposite the upper surface of the positioning device, wherein the upper surface of the positioning device is arranged, for example, on a supporting arm, which extends, for example, substantially in the horizontal direction, while, starting from this supporting arm, the positioning device advantageously extends away therefrom substantially in the vertical direction.

Advantageously, the retaining device is arranged or mounted, at least in some sections, on the positioning device, such that it is rotatable about a pivot point. The retaining device can be swung up out of, or swung out of, or swiveled out of the positioning device, or starting from the positioning device, wherein the retaining device hence acts in the form of a swivel arm, which is swiveled or rotated about the pivot point. The pivot point or the rotational axis here extends substantially parallel to a longitudinal axis of the positioning device, wherein the longitudinal axis of the positioning device advantageously extends in the vertical direction. It is also contemplated, however, that the retaining device is translatorily displaceable, starting from the positioning device, and in particular from a center axis of the positioning device, and hence is pushed out of, for example, the above-stated cutout of the positioning device, or can be pushed protrudingly out of the bottom region of the positioning device. It is additionally contemplated that the retaining device is swung out of the positioning device and is hence configured in the form of a barb. By means of the above-stated retaining device there is hence created a support surface of the transport device, by which the semifinished product can at least in some sections be undergripped, and hence raised and transported.

The transport device has a carrier element, which is designed such that it is movable relative to the semifinished product and on which the positioning device and/or the retaining device are arranged. The carrier element or the supporting arm hence serves to arrange or hold the positioning device and/or the retaining device. The carrier element advantageously extends in the horizontal direction. The carrier element itself is moved, for example via appropriate guide rails, along a guideway, so that the semifinished product positioned with the positioning device and held with the retaining device can be transported along the guideway, for example from a first processing device to a second processing device. Furthermore, the carrier element can be moved up or down in the vertical direction and hence away from a processing device and toward a processing device. As a result of the, for example, lowering of the carrier element in the direction of the processing device, it is possible that the positioning device, at least in some sections, penetrate into, for example, the engagement regions of the semifinished product in order to enable a positioning of the semifinished product at least relative to the transport device. When the retaining device are withdrawn or unscrewed and hence arranged on the appropriate surface of the semifinished product, and the carrier element is moved in the vertically upward direction, the transport device and the semifinished product connected to the transport device, or the semifinished product carried by the transport device, is hence moved upward in the vertical direction in order to enable the semifinished product to be received or lifted off and to be removed from the processing device.

The retaining element is designed such that it is movable relative to the carrier element. The carrier element, which can be, for example, a supporting arm or a carrier plate or a carrier platform and is itself advantageously designed such that it is movable in the vertical and horizontal direction, hence advantageously serves to hold and align the retaining device itself. The retaining device is consequently arranged such that it is movable relative to the carrier element in the translatory direction and hence in the vertical direction, as well as in the horizontal direction, and advantageously also in the rotatory direction or rotational direction, when swiveled about a defined pivot point.

The positioning device has a recess for receiving, at least in some sections, a locating element of a processing device. The processing device is, for example, an impregnating device for applying an impregnating agent, such as an impregnating resin, to at least an application surface of the semifinished product or a consolidation device for shaping the tool and cross-linking the semifinished product fibers. The recess of the positioning device is advantageously designed such that an upper surface, and in particular a penetration surface or a penetration portion of the locating element of the processing device, can be introduced into the recess. Consequently, the recess and at least an upper region of the locating element have a comparable shape and are designed, for example, in the form of a cylindrical cone.

During the process of receiving the semifinished product and also during the process of depositing the semifinished product respectively from a processing device and in a processing device, the positioning device is mounted on the locating element of the processing device in such a way that at least a portion of the locating element can be introduced into the recess of the positioning device, so that advantageously the positioning device and also the locating element are centrically aligned. As a result, a defined arrangement or positioning of the semifinished product relative to the transport device, and hence also relative to the processing device to be transported, is enabled. The locating element itself advantageously serves to position the semifinished product within the processing device and to hold it at least periodically during the processing.

Furthermore, a processing device for processing a semifinished product is provided, wherein the processing device is a component part of a semifinished product manufacturing plant and has at least one locating element for arranging the semifinished product relative to the processing device. According to the invention, the locating element can be introduced into an engagement region of the semifinished product. The locating element, which is designed, for example, in the form of a locating pin, hence extends from a receiving plate or a locating surface of the processing tool advantageously upward in the vertical direction, so that the semifinished product to be processed is thereby able to be placed onto the locating element.

Advantageously, the processing device, which is, for example, an impregnating device for applying the impregnating agent, such as, in particular, the impregnating resin, or is a consolidation device for cross-linking the fibers or for shaping the semifinished product, has more than one locating element, and in particular two or more locating elements. Advantageously, the plurality of locating elements are spaced apart, so that a defined arrangement and alignment of the semifinished product in the processing device can be enabled. Advantageously, the locating elements of the processing device are also arranged such that, in consideration of the Poka-Yoke principle, an incorrect arrangement of the semifinished product in terms of its alignment within the processing device is avoided. The locating element advantageously has, at least in some sections, a cylindrical shape. The locating element advantageously has in the upper end region (distal end of the locating element), which at least in some sections enters into contact with the engagement region of the semifinished product, a substantially frustoconical form, which hence comprises lead-in chamfers in order to enable easy mounting of the semifinished product onto the locating element of the processing device. Advantageously, the locating element also fully penetrates the thickness of the semifinished product, insofar as, for example, the semifinished product possesses a through bore as the engagement region.

The locating element may be arranged such that it is movable relative to the processing device by way of a spring element. The spring element is, for example, a compression spring, which is connected to a region of the locating element, and in particular to a lower distal end of the locating element, which end lies opposite that region of the locating element which, at least in some sections, makes contact with the engagement region of the semifinished product, namely lies opposite the upper distal end of the locating element. In particular when the positioning device is mounted onto the locating element, the spring element is compressed, so that the spring element is compressed such that the locating element is advantageously pushed out of or moved out of, and hence expelled from, the engagement region of the semifinished product by way of, in particular, the positioning device of the transport device. Consequently, the semifinished product is advantageously transferred in a simple and reliable manner, in terms of its positioning, from the processing device to the transport device. It is also contemplated, however, that the locating element is arranged rigidly and immovably on a processing platform of the processing device and hence cannot be expelled by the positioning device when the semifinished product is received and/or deposited respectively from and in a processing device. Moreover, a rigid, and in particular immovably arranged locating element has merely such a small length or size that the locating element can reach merely into a segment of the engagement region and hence does not fully penetrate the thickness or length of the engagement region.

In the described processing device, all the advantages which have already been described in connection with a transport device for transporting the semifinished product according to the first aspect of the invention are obtained.

Furthermore, a semifinished product manufacturing plant for manufacturing a semifinished product, and in particular an impregnated semifinished product, is provided, which manufacturing plant has a transport device and/or a processing device according to embodiments of the invention. Advantageously, the semifinished product manufacturing plant has at least one impregnating device and advantageously, in addition, at least also one consolidation device. The transport device of the semifinished product manufacturing plant serves, in particular, to receive, transport and deposit the semifinished product between the at least one impregnating device and the at least one consolidation device of the semifinished product manufacturing plant. It is additionally contemplated that the semifinished product manufacturing plant also has a braiding unit for enwrapping a support core, for example, with braiding mats or fibers for the creation of a fiber hollow component, which in the impregnating device is saturated by the impregnating agent.

In the described semifinished product manufacturing plant according to the invention, all the advantages which have already been described in relation to a transport device for transporting the semifinished product and/or to a processing device for processing the semifinished product according to the preceding aspects are obtained.

In addition, a transport method for receiving, transporting and depositing a semifinished product from and to a processing device by means of a transport device is provided, wherein, for the take-up of the semifinished product, at least one positioning device of the transport device for positioning the semifinished product relative to the transport device is introduced into an engagement region of the semifinished product, and at least one retaining device of the transport device, for holding the semifinished product on the transport device, is arranged at least in some sections on a surface of the semifinished product. Consequently, for the take-up of the semifinished product, for example, the transport device is moved, and in particular conveyed, in such a way into the region of the first processing device that the at least one positioning device of the transport device engages in the engagement region of the semifinished product such that a positioning of the semifinished product relative to the transport device can be enabled. Following the engagement or introduction of the positioning device into the engagement region of the semifinished product, a retaining device of the transport device is conveyed out or turned out or moved in the direction of the semifinished product to be transported such that this can be arranged on a surface, and in particular on a receiving or support surface, and in particular in a region of this support surface of the semifinished product, in order to enable raising of the semifinished product from the processing device and a secure and slip-free transport to, for example, a further processing device. It is thus contemplated, for example, that the retaining device is conveyed into the slots of a, for example, slotted impregnating tool in order that the semifinished product can be arranged on the lower surface, in particular since in these regions the semifinished product to be transported does not rest on a surface of the processing device. The impregnating device itself is advantageously slotted or advantageously has passages in the bottom region of the support plate in order to ensure evacuation of excess impregnating agent which cannot be absorbed by the semifinished fiber product to be impregnated.

Through a positioning of the semifinished product by use of the positioning device and an undergripping of the semifinished product by use of the retaining device, a simple, secure and precise transportation, and in particular take-up and depositing, of a semifinished product of whatever design and shaping is possible. In particular, a sagging of the semifinished product or a deformation of the semifinished product during transport is also avoided. As a result, the quantity of rejects, and consequently the production costs, is minimized.

A transport device of the preceding type for receiving, transporting and depositing a semifinished product, and/or a processing device of the preceding type for processing a semifinished product is or are used. Advantageously, it is hence possible that, in the take-up process of the semifinished product, the positioning device penetrates into the engagement region of the semifinished product such that those locating elements of the processing tool which are already arranged in the engagement region of the semifinished product can be moved by way of the positioning device counter to a spring force of a spring element for alignment of the locating element, so that the locating elements are pushed, and in particular moved, out of the engagement region of the semifinished product by way of the positioning device. As a result, a transfer of the semifinished product from the locating element to the positioning device is enabled.

Advantageously, the positioning device and also the locating element have a mutually comparable form, and in particular a circular-cylindrical form. The positioning device of the transport device advantageously also has a recess, which is designed such that an upper distal region, and in particular a head region, of the locating element of the processing device can be introduced, at least in some sections, into this recess of the positioning device, so that, in particular, a slippage of the positioning device on the locating element is avoided. However, it is also contemplated that the locating element of the processing device is dimensioned such that it does not extend fully through the engagement region of the semifinished product, so that pushing out or moving out of the locating element by way of the positioning device of the transport device is not necessary to enable the positioning device to be introduced sufficiently far into the engagement region. In this case, the processing device has no spring element for the movable arrangement of the locating element.

Furthermore, it is possible that the positioning device and the retaining device are arranged in such a way in relation to each other that the retaining device, when the positioning device is introduced into the engagement region of the semifinished product, is hence likewise transported through the engagement region of the semifinished product and is arranged in an exit area of the engagement region. Consequently, the semifinished product has, in particular, a through bore as the engagement region, through which the positioning device fully reaches, so that the retaining device, which is arranged, for example, in an end region of the positioning device or in a recess of the positioning device, in order not to impede movement of the positioning device through the engagement region, can be moved out of, and in particular swiveled out of, this starting position into a holding position so that it can be arranged in a region of a surface of the semifinished product, which arrangement allows a take-up, and in particular transportation, of the semifinished product to be realized.

In the described transport method, all the advantages which have already been described in relation to a transport device, a processing device, and/or a semifinished product manufacturing plant according to the preceding aspects of the invention are obtained.

Embodiments of a semifinished product manufacturing plant according to the invention, as well as of a transport device according to the invention and a processing device according to the invention, are explained in greater detail below on the basis of drawings, in which, respectively in schematic representation:

BRIEF DESCRIPTION OF THE DRAWINGS

FIG. 3c shows in a side view that embodiment of a semifinished product manufacturing plant according to the invention which is shown in FIGS. 3a and 3b, during a process of depositing the semifinished product in the processing device.

FIG. 4a shows in a plan view a sectional representation of an embodiment of a positioning device of a transport device according to the invention.

FIG. 4b shows in a side view a sectional representation of that embodiment of the positioning device of the transport device according to the invention which is shown in FIG. 4a.

FIG. 5b shows in a side view a sectional representation of that further embodiment of the positioning device of the transport device according to the invention which is shown in FIG. 5a.

DETAILED DESCRIPTION OF THE DRAWINGS

Elements having the same function and working method are in FIGS. 1a to 4d respectively provided with the same reference symbols.

Figure 1A:
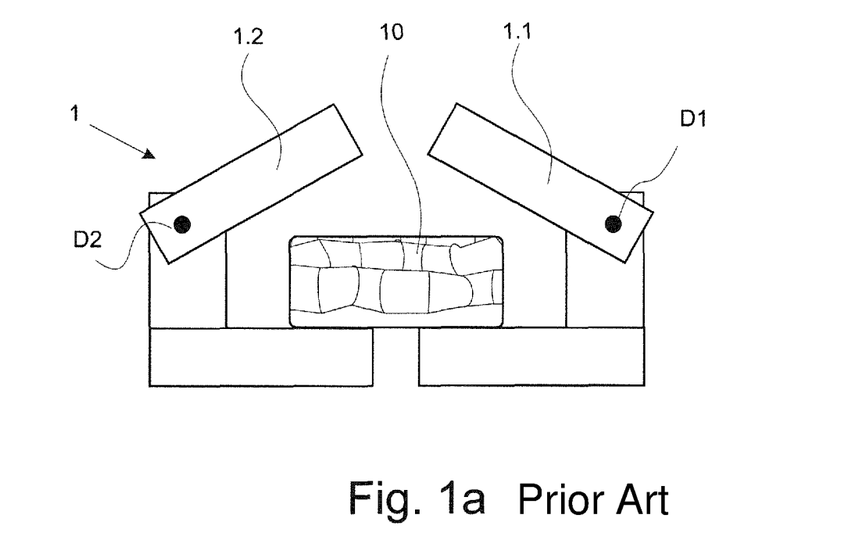
FIG. 1a shows in a side view a clamping gripper known from the prior art, in an open position.

In FIG. 1a is represented in a side view a basic diagram of a clamping gripper 1 known from the prior art and having at least two movable gripping arms 1.1, 1.2, which are respectively mounted, at least in some areas, rotatably or pivotably about a pivot point D1 and/or D2. The gripping arms 1.1, 1.2 serve to grip the semifinished product 10, which is, for example, a semifinished product 10 which is yet to be impregnated or has already been impregnated.

Figure 1B:
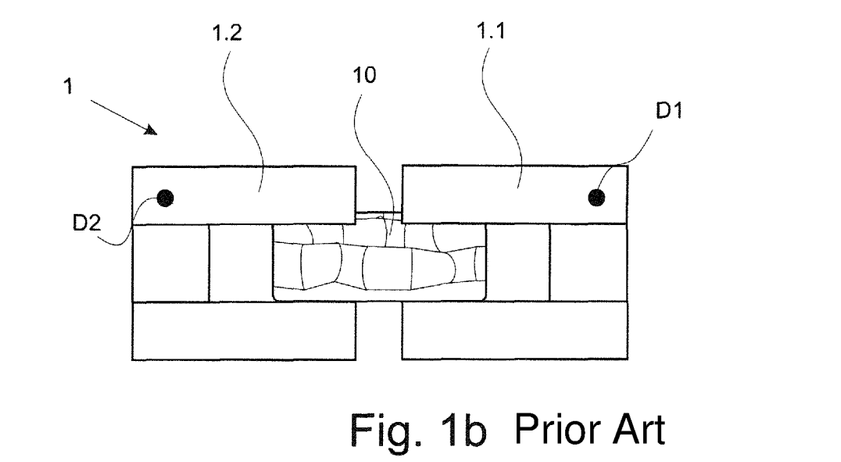
FIG. 1b shows in a side view that embodiment of a clamping gripper known from the prior art which is shown in FIG. 1a, in a closed position.

As shown, in particular, also in FIG. 1b, which in a side view shows in a closed position that clamping gripper 1 which is shown in FIG. 1a and in which the gripping arms 1.1, 1.2 clamp the semifinished product 10 at least at the margin, the position of the semifinished product 10 cannot, however, be precisely held. Hence a slippage of the semifinished product 10, at least during the transport of the semifinished product from, for example, a first processing device to a second processing device, is not precluded. Furthermore, a precise, and in particular reliable, take-up of the semifinished product from a processing tool, as well as a simple and reliable depositing of the semifinished product 10 in a processing tool by use of a clamping gripper, as shown in FIGS. 1a and 1b, are also disadvantageously not possible, in particular due to the inflexibly movable gripping arms 1.1 and 1.2.

Figure 2A:
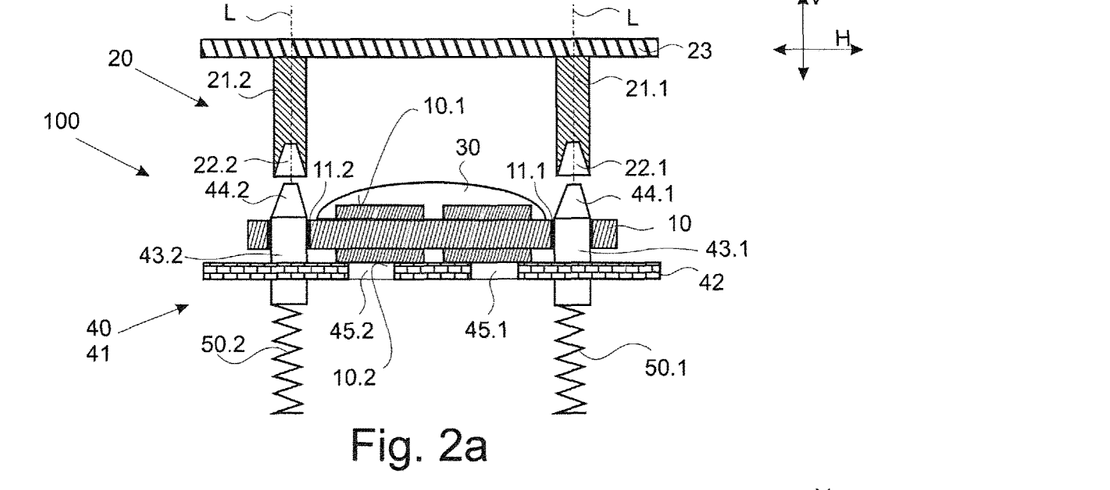
FIG. 2a shows in a side view a first embodiment of a semifinished product manufacturing plant according to the invention, comprising an embodiment of a transport device and an embodiment of a processing device, during the process of moving the transport device up to the processing device.
Figure 2B:
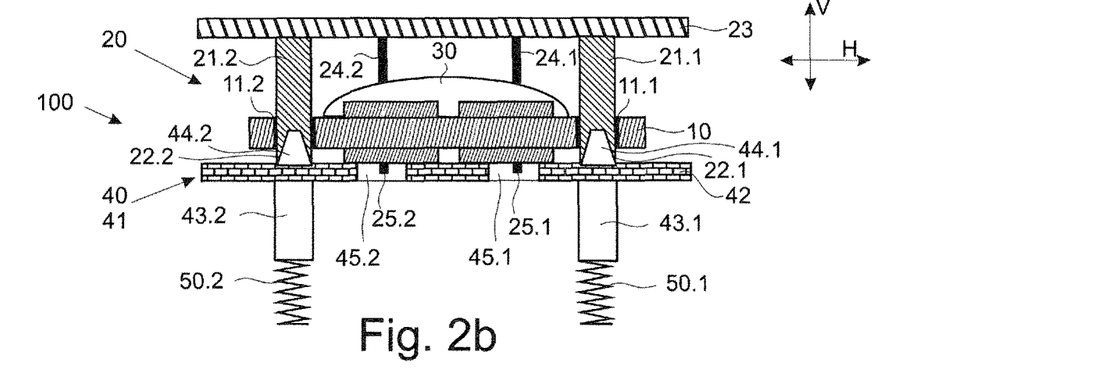
FIG. 2b shows in a side view that embodiment of a semifinished product manufacturing plant according to the invention which is shown in FIG. 2a, during a take-up process of the semifinished product from the processing device by the transport device.
Figure 2C:
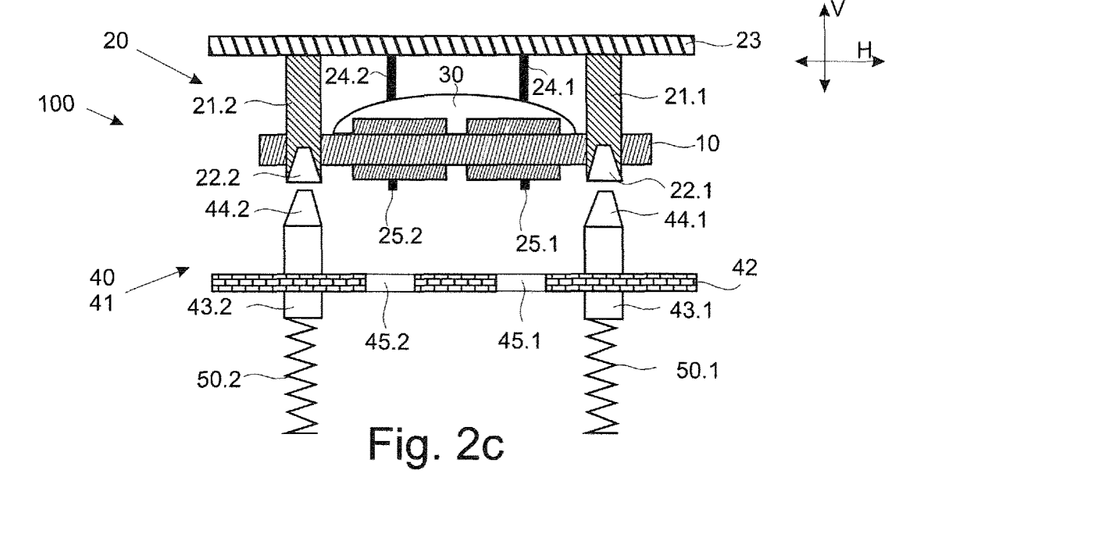
FIG. 2c shows in a side view that embodiment of the semifinished product manufacturing plant according to the invention which is shown in FIGS. 2a and 2b, during a process of lifting the semifinished product off the processing device and transporting it by means of the transport device.

In FIGS. 2a to 2c is shown an embodiment of a semifinished product manufacturing plant 100 according to the invention, which has a transport device 20 and a processing device 40, wherein the processing device 40 is, for example, an impregnating device 41. By means of the impregnating device 41, it is possible to apply an impregnating agent 30, such as, in particular, an impregnating resin, to the semifinished product 10, and advantageously to an application surface 10.1 of the semifinished product 10. The impregnating agent 30 hence saturates the semifinished product 10 and encases the fibers in order to impregnate them. The processing device 40 or impregnating device 41 has, moreover, a receiving plate 42, within which slots 45.1 and 45.2 or passages 45.1 and 45.2 extending continuously through the thickness of the receiving plate 42 are advantageously made, allowing excess impregnating agent 30 to flow off from the processing device 40 or 41 through the slots or passages. Furthermore, the processing device 40 or 41 has locating elements 43.1 and 43.2, which extend through engagement regions 11.1 and 11.2 of the semifinished product 10. It would also be contemplated, however, that the locating elements 43.1 and 43.2 of the processing device are introduced merely in some sections into the engagement regions 11.1 and 11.2 of the semifinished product 10. In FIGS. 2a to 2c are shown two locating elements 43.1 and 43.2, wherein the processing device 40 or 41 can also merely have just one locating element 43.1 or 43.2 or more than two locating elements 43.1 and 43.2.

The embodiment of the transport device 20 as shown in FIGS. 2a to 2c has, inter alia, a carrier element 23, which, for example, advantageously extends along a horizontal direction H or in a horizontal plane H, comparable to the receiving plate 42 of the processing device 40 or 41. Starting from the carrier element 23, the positioning device 21.1 or 21.2 extends in a vertical direction V in the direction of the processing device 40 or 41. The positioning device 21.1 and 21.2 hence extend along a longitudinal axis L of the positioning device. In FIGS. 2a to 2c are shown two positioning device 21.1 and 21.2, though it is also contemplated that the transport device 20 has merely one positioning device 21.1 or 21.2 or more than two positioning device 21.1 and 21.2.

In a lower region, the positioning device 21.1 or 21.2 has a recess 22.1 or 22.2, which is advantageously designed such that a lead-in region 44.1 or 44.2 of the locating element 43.1 or 43.2 can be introduced into the recess 22.1 or 22.2. As can be seen, in particular, from FIGS. 2a to 2c, the recess 22.1 or 22.2 has a comparable shape to the lead-in region 44.1 or 44.2, wherein both are advantageously of frustoconical design. The semifinished product 10 also has a locating surface 10.2, which lies opposite the application surface 10.1. The locating surface 10.2, which can also be referred to as the contacting surface 10.2, makes contact at least in some sections with the receiving plate 42 of the processing device 40 or 41, though there are also regions on the locating surface 10.2 which are designed distant from the receiving plate 42. In FIG. 2a, still no retaining device for holding the semifinished product 10 are evident, since these are advantageously in a retracted position, for example in a region of the carrier element 23, and advantageously are only swiveled out or extended once the positioning device 21.1 or 21.2 is inserted in the engagement region 11.1 or 11.2 of the semifinished product 10. This is shown, in particular, in FIG. 2b.

In FIG. 2b is hence shown, in a side view, the introduction of the positioning device 21.1 and 21.2 into the engagement regions 11.1 and 11.2 of the semifinished product 10, wherein the locating elements 43.1 and 43.2, respectively, are expelled from the engagement regions 11.1 and 11.2 by means of the positioning device 21.1 and 21.2. To this end, the spring elements 50.1 and 50.2 shown already in FIG. 2a are also compressed, so that the locating elements 43.1 and 43.2 are moved in the vertical direction V downward out of the engagement regions 11.1 and 11.2 of the semifinished product 10. For this purpose, the lead-in region 44.1 or 44.2 is introduced into the corresponding recess 22.1 or 22.2 of the respective positioning device 21.1 or 21.2. Furthermore, in FIG. 2b, retaining device 24.1 and 24.2 are shown in an extended position, wherein each retaining device 24.1 and 24.2 has a holding region 25.1 and 25.2, which, for example in the region of the slots 54.1, 54.2 of the processing device 40 or 41, makes contact with the locating surface 10.2 (cf. FIG. 2a) of the semifinished product 10, or extends along this surface 10.2, such that the semifinished product 10 is hence contacted by way of the retaining device 24.1 or 24.2, and in particular the contact regions 25.1 and 25.2. The semifinished product 10 is hence undergripped by way of the retaining device 24.1 or 24.2, and in particular their contact regions 25.1 and 25.2. The retaining device 24.1 and 24.2 are configured, in particular, in the form of gripping arms or forks, as known, for example, in a forklift truck, in order to enable undergripping and hence raising and holding of the semifinished product 10 during the transport of the semifinished product 10.

In particular, the raising of the semifinished product 10, and hence the take-up of the semifinished product 10 by way of the transport device 20, is shown, for example, in FIG. 2c. The transport device 20 is here moved upward in the vertical direction V, whereupon, by means of the retaining device 24.1 and 24.2, the semifinished product 10 positioned by the positioning device 21.1 and 21.2 is likewise moved upward in the vertical direction V. Based on the removal of the semifinished product 10 from the processing device 40, and in particular the impregnating device 41, and based on the movement of the transport device 20 upward in the vertical direction V, the compressive force applied to the locating elements 43.1 and 43.2 by the positioning device 21.1 and 21.2 is also removed. Based on the spring force of the spring elements 50.1 and 50.2, which subject the locating elements 43.1 and 43.2 to a spring force, these locating elements 43.1 and 43.2 are thus moved upward again in the vertical direction V.

Figure 3A:
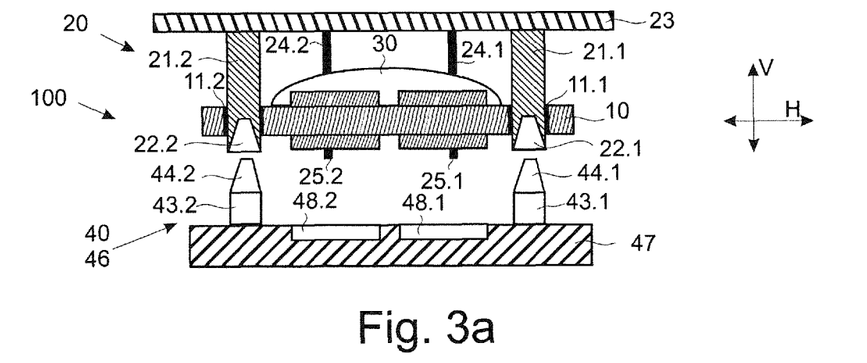
FIG. 3a shows in a side view a further embodiment of a semifinished product manufacturing plant according to the invention, comprising that embodiment of a transport device which is shown in FIGS. 2a to 2c and comprising a further embodiment of a processing device, during the process of transporting the semifinished product to the processing device.
Figure 3B:
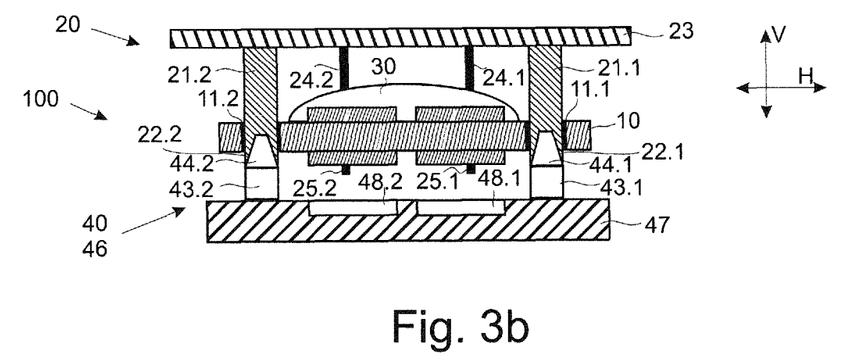
FIG. 3c shows in a side view that embodiment of a semifinished product manufacturing plant according to the invention transport device which is shown in FIG. 3a, during the process of transferring the semifinished product from the transport device to the processing device.
Figure 3C:
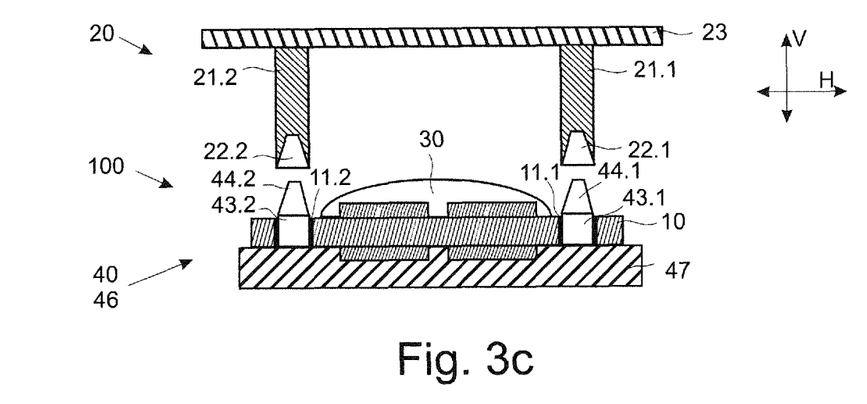

In FIG. 3a is schematically shown in a side view a further embodiment of a semifinished product manufacturing plant 100 according to the invention, which, as shown in FIGS. 2a to 2d, has a transport device 20. In addition, the semifinished product manufacturing plant 100 according to the invention has a processing device 40, and in particular, as shown in FIGS. 3a to 3c, a consolidation device 46. The consolidation device 46, which advantageously serves to shape the semifinished product and to cross-link the fibers of the semifinished product, has, for example, a base plate 47 having protrusions 48.1 and 48.2, which, in the form of a pressing tool, serve to shape the semifinished product 10. Furthermore, the consolidation device 46 has locating elements 43.1 and 43.2, which are arranged in a twistproof or fixed and rigid manner on the base plate 47 and extend substantially in the vertical direction V upward away from the base plate 47. The locating elements 43.1 and 43.2 are substantially comparable to the locating elements 43.1 and 43.2 shown in FIGS. 2a to 2c and hence also have a lead-in region 44.1 and 44.2, which substantially have an identical shape to the recess 22.1 or 22.2 of the positioning device 21.1 or 21.2 of the transport device 20.

As shown in FIG. 3a, the semifinished product 10 positioned and held or transported with the transport device 20 is transported in the region of the consolidation device 46, wherein the positioning device 21.1 and 21.2 are moved into the region of the locating elements 43.1 and 43.2 such that, when the transport device 20 is lowered or moved downward in the vertical direction V, the lead-in regions 44.1 and 44.2 can be introduced into the recesses 22.1 and 22.2, so that a precise transfer of the semifinished product from the transport device 20 to the consolidation device 46 and a precise positioning of the semifinished product 10 in the consolidation device 46 is enabled.

The bringing together of the transport device 20 with the consolidation device 46 or the processing device 40 is shown, in particular, in FIG. 3b. It is here clearly shown how the lead-in regions 44.1 and 44.2 are introduced into the recesses 22.1 and 22.2. Based on the rigidly arranged locating elements 43.1 and 43.2, a complete depositing of the semifinished product 10 onto the base plate 47 of the consolidation device 46, as shown in FIG. 3b, is not possible. For this purpose, it would be contemplated that the retaining device 24.1 and 24.2 are further extended downward in the vertical direction V such that the semifinished product 10 is placed onto the base plate 47 merely via the retaining device 24.1 and 24.2.

In FIG. 3c is shown the depositing of the semifinished product 10 in the consolidation device 46, wherein the transport device 20 is moved back upward in the vertical direction V in order to be able to be moved out of the region of the consolidation device 46. As shown in FIG. 3c, the locating elements 43.1 and 43.2 penetrate the corresponding engagement regions 11.1 and 11.2 of the semifinished product 10, so that the semifinished product 10 is hence arranged precisely in the region of the consolidation device 46. It is also possible, however, that the locating elements 43.1 and 43.2 do not fully penetrate the engagement regions 11.1 and 11.2, but engage in these engagement regions 11.1 and 11.2 merely in some sections.

It is additionally contemplated that those embodiments of a semifinished product manufacturing plant 100 according to the invention which are shown in FIGS. 2a to 3c also merely represent regions of an embodiment of a joint semifinished product manufacturing plant 100 according to the invention. This means that, within the scope of the invention, the semifinished product manufacturing plant 100 has in addition to a first processing device 40, which in particular is an impregnating device 41, also at least a second processing device 40, which in particular is a consolidation device 46, as well as also a transport device 20, which transports a semifinished product between the first and the at least second processing device 40. Each of the processing devices 40 of the manufacturing plant 100 can be designed comparable to those embodiments of the processing device 40 which are shown in FIGS. 2a to 3c. This means, for example, that the individual processing devices 40 can have spring-mounted locating elements 43.1, 43.2, or rigid locating element 43.1, 43, slots 45.1, 45.2, and/or protrusions 48.1, 48.2, etc. Advantageously, the individual components of the processing device 40 are variably combinable with one another, so that the processing device 40 is not restricted to any defined design.

In FIGS. 4a to 4d, a detail of a further embodiment of a transport device 20, and in particular a positioning device 21.1 of the transport device 20, are shown. The positioning device 21.1 has a cutout 27, within which one or two retaining device 26.1 or 26.2 is or are arranged. The retaining device 26.1 and 26.2 are respectively mounted rotatably about a pivot point D1 or D2. As also shown already in FIGS. 3a to 3c and 2a to 2c, the positioning device 21.1 is arranged on a carrier element (not shown here) of the transport device 20. Contrary to the previously shown embodiments of the transport device 20, the retaining device 26.1 or 26.2 is not however arranged independently on the carrier element, but on the positioning device 21.1 itself.

Figures 4A, 4B:
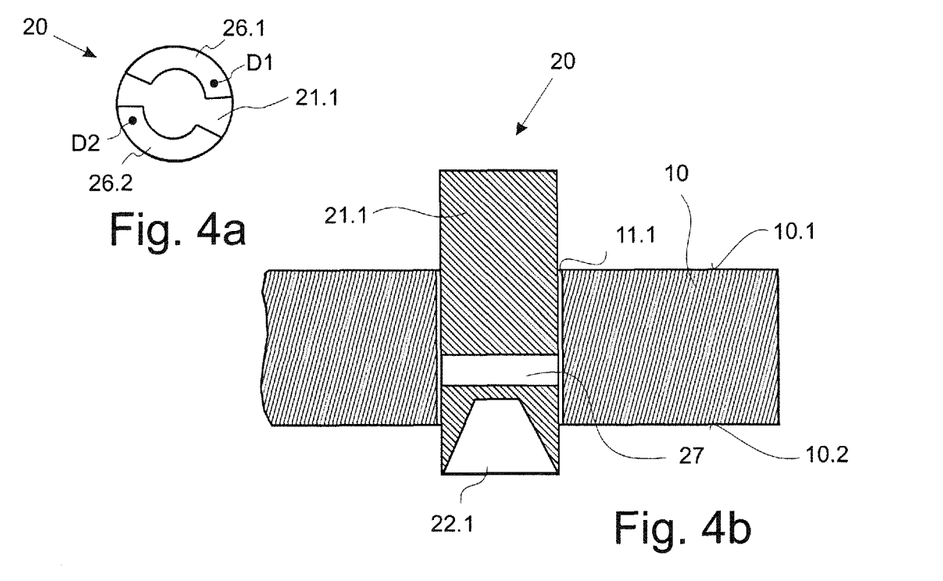
Figures 4C, 4D:
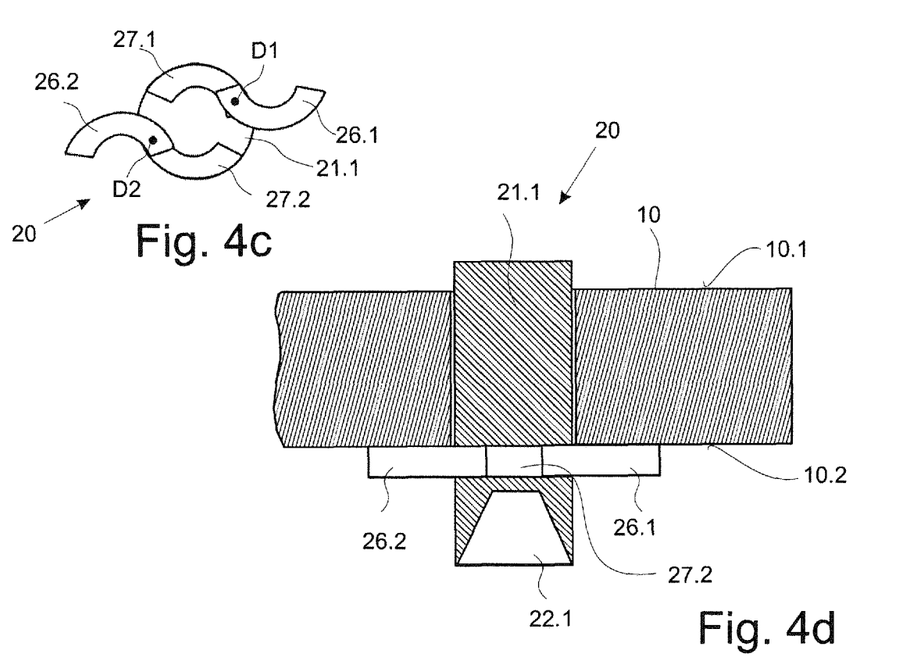
FIG. 4c shows in a plan view a sectional representation of that embodiment of a positioning device which is shown in FIGS. 4a and 4b, with swiveled-out retaining device.
FIG. 4d shows in a side view a sectional representation of that embodiment of a positioning device which is shown in FIGS. 4a to 4c, with extended or swiveled-out retaining device.

While in FIGS. 4a and 4b the positioning device 21.1 is shown with collapsed or retracted retaining device 26.1 and 26.2 in the region of the cutout 27, in FIGS. 4c and 4d the positioning device 21.1 is shown with swiveled-out or extended retaining device 26.1 and 26.2. The retaining device 26.1 and 26.2 have herein been swiveled about the pivot point D1 or D2, which can also be referred to as the rotational axis, such that this is arranged on a locating surface 10.2 of the semifinished product 10. The retaining device 26.1 and 26.2 hence extend at least in some sections along a locating surface 10.2 of the semifinished product 10.

As shown in FIGS. 4a to 4d, the retaining device 26.1 and 26.2 can be configured curved, and in particular curved in the form of a semicircle, as retaining arms. It is contemplated, however, that the retaining device 26.1 and 26.2 can have any design and form. In this context, it should merely be borne in mind that the retaining device 26.1 and 26.2 can advantageously be introduced into the cutout 27 of the positioning device 21.1 such that the positioning device 21.1 can be guided fully through the engagement region 11.1 of the semifinished product such that a guide-through movement of the positioning device 21.1 through the engagement region 11.1 by means of the retaining device 26.1 and 26.2 is not prevented or made more difficult.

As shown in FIG. 4d, the positioning device 21.1 is advantageously guided so far through the engagement region 11.1 of the semifinished product 10 that, when the retaining device 26.1 or 26.2 is moved out of or swiveled out of the cutout 27 of the positioning device 21.1, an undergripping of the semifinished product 10 is enabled.

In FIGS. 4a to 4d is respectively merely represented a positioning device 21.1, wherein the version of the positioning device 21.1 shown in FIGS. 4a to 4d is also usable for the further positioning device arranged in the transport device 20.

Figure 5A:
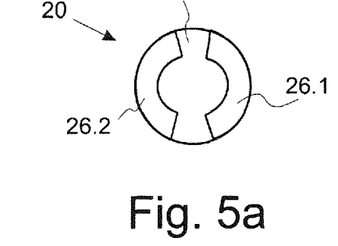
FIG. 5a shows in a plan view a sectional representation of a further embodiment of a positioning device of a transport device according to the invention.

In FIG. 5a, a sectional representation of a further embodiment of a positioning device 21.1 of a transport device 20 according to the invention is shown in a plan view. The positioning device 21.1 here has two retaining device 26.1 and 26.2, which are respectively arranged in cutouts (not shown here) of the positioning device 21.1 and are advantageously withdrawn or unscrewed only upon requirement.

Figure 5B:
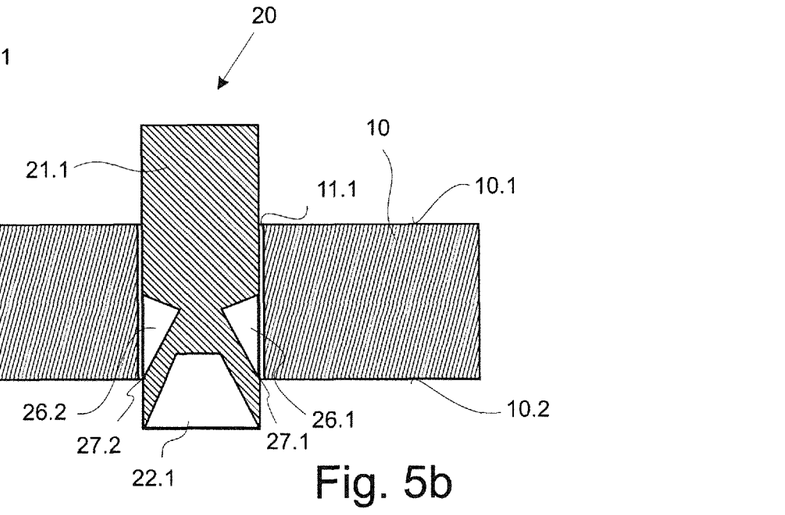

Advantageously, the retaining device 26.1 and 26.2 shown in FIG. 5*a* are configured in the form of barbs, which, at least during the movement of the positioning device 21.1 through the engagement region 11.1 of the semifinished product 10, as shown, in particular, in FIG. 5*b*, are arranged fully in the cutouts 27.1 and 27.2, so that a trouble-free movement of the positioning device 21.1 through the engagement region 11.1 can be ensured.

Figures 5C, 5D:
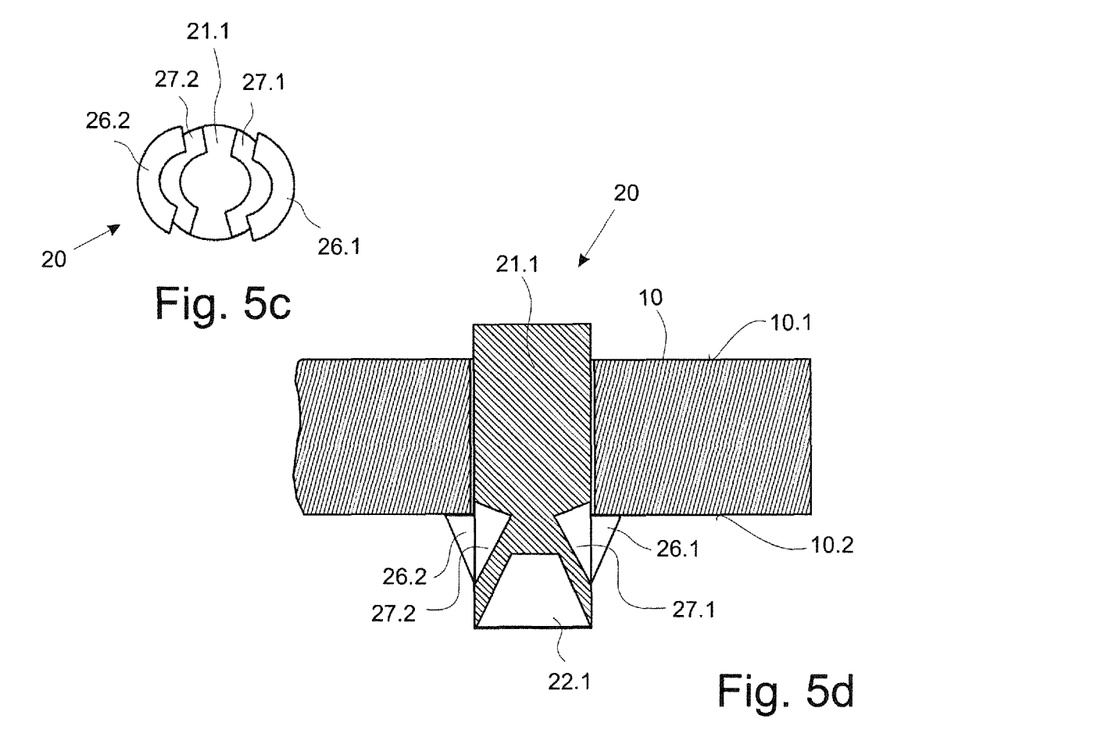
FIG. 5c shows in a plan view a sectional representation of that further embodiment of a positioning device which is shown in FIGS. 5a and 5b, with extended retaining device.
FIG. 5d shows in a side view a sectional representation of that further embodiment of a positioning device which is shown in FIGS. 5a to 5c, with extended retaining device.

While in FIGS. 5*a* and 5*b* a positioning device 21.1 is shown with collapsed or retracted retaining device 26.1 and 26.2, in FIGS. 5*c* and 5*d* that further embodiment of a positioning device 21.1 which is shown in FIGS. 5*a* and 5*b* is shown with extended retaining device 26.1 and 26.2. Advantageously, the retaining device 26.1 and 26.2 are moved, and in particular swung, so far out of the cutouts 27.1 and 27.2 of the positioning device 21.1, insofar as it is a question of barb-like retaining device, that these can be arranged on a region of a locating surface 10.2 of the semifinished product 10 or make contact with this locating surface 10.2, at least in some sections. Advantageously, the retaining elements 26.1, 26.2 themselves have support regions, which extend at least so far along the locating surface 10.2 of the semifinished product 10 that a raising of the semifinished product out of a processing device (not shown here), and also a transportation of the semifinished product 10 as well as a depositing of the semifinished product 10 into a processing device (not shown here), can be enabled in a simple and cost-effective, as well as process-free manner, without the semifinished product 10 slipping, warping or being otherwise deposited.

In FIGS. 5*a* to 5*d*, a positioning device 21.1 is respectively represented, wherein the version of the positioning device 21.1 shown in FIGS. 5*a* to 5*d* is also usable for the further positioning device arranged in the transport device 20.

REFERENCE SYMBOL LIST 1 clamping gripper (prior art)
1.1, 1.2 gripping arm of the clamping gripper
10 semifinished product
10.1 application surface
10.2 locating surface
11.1, 11.2 engagement region
20 transport device
21.1, 21.2 positioning device(s)
22.1, 22.2 recess of the positioning device(s)
23 carrier element
24.1, 24.2 retaining device(s)
25.1, 25.2 contact region
26.1, 26.2 retaining device(s)
27, 27.1, 27.2 cutout
30 impregnating agent
40 processing device
41 impregnating device
42 receiving plate
43.1, 43.2 locating element
44.1, 44.2 lead-in region of the locating element
45.1, 54.2 slots of the receiving plate
46 consolidation device
47 base plate
48.1, 48.2 protrusion of the base plate
50.1, 50.2 spring element
100 semifinished product manufacturing plant
V vertical direction/vertical plane
H horizontal direction/horizontal plane
L longitudinal axis of the positioning device(s)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transport device that transports a semifinished product, the transport device being a component part of a semifinished product manufacturing plant, the transport device comprising:
   one or more positioning devices configured to position the semifinished product relative to the transport device;
   one or more retaining devices configured to hold the semifinished product on the transport device, wherein
   the one or more positioning devices are introducible into an engagement region of the semifinished product and the one or more positioning devices each have a respective cutout,
   the one or more retaining devices are arranged on respective ones of the one or more positioning devices so as to be rotatable about a respective pivot point, and
   the pivot point extends substantially parallel to a longitudinal axis of the respective positioning device such that the retaining device is rotatable about the pivot point in a first direction to swivel out of the respective cutout of the respective positioning device and to rotate on, and parallel to, a locating surface of the semifinished product and to extend along the locating surface of the semifinished product and such that the retaining device is rotatable about the pivot point in a second direction that is opposite to the first direction to collapse into the respective cutout of the respective positioning device.

2. The transport device according to claim 1, further comprising:
   a carrier element of the transport device, the carrier element being configured to be movable relative to the semifinished product, wherein
   the one or more positioning devices are arranged on the carrier element.

3. The transport device according to claim 2, wherein
   the one or more retaining devices are configured to be movable relative to the carrier element.

4. The transport device according to claim 1, wherein
   at least one of the one or more positioning devices has a recess configured to receive a locating element of a respective one of the one or more processing devices.

5. A semifinished product manufacturing plant that manufactures a semifinished product, the manufacturing plant comprising:
   a transport device comprising:
      one or more positioning devices configured to position the semifinished product relative to the transport device;
      one or more retaining devices configured to hold the semifinished product on the transport device, wherein
      the one or more positioning devices are introducible into an engagement region of the semifinished product and the one or more positioning devices each have a respective cutout,
      the one or more retaining devices are arranged on respective ones of the one or more positioning devices so as to be rotatable about a respective pivot point, and the pivot point extends substantially parallel to a longitudinal axis of the respective positioning device such that the retaining device is rotatable about the pivot point in a first direction to swivel out of the respective cutout of the respective positioning device and to rotate on, and parallel to, a locating surface of the semifinished product and to extend along the locating surface of the semifinished product and such that the retaining device is rotatable about the pivot point in a second direction that is opposite to the first direction to collapse into the respective cutout of the respective positioning device; and a processing device comprising:

one or more locating elements configured to arrange the semifinished product relative to the processing device, wherein the one or more locating elements are introducible into respective engagement regions of the semifinished product.

6. The semifinished product manufacturing plant according to claim 5, wherein the manufacturing plant manufactures an impregnated semifinished product.

7. A method for receiving, transporting and depositing a semifinished product from and to a processing device, the method comprising the acts of:

for taking-up the semifinished product, introducing one or more positioning devices of a transport device into respective engagement regions of the semifinished product, the one or more positioning devices being configured to position the semifinished product relative to the transport device and the one or more positioning devices each having a respective cutout; and for holding the semifinished product on the transport device, arranging one or more retaining devices of the transport device on a surface of the semifinished product, wherein the one or more retaining devices are arranged on respective ones of the one or more positioning devices so as to be rotatable about a respective pivot point, and wherein the pivot point extends substantially parallel to a longitudinal axis of the respective positioning device such that the retaining device is rotatable about the pivot point in a first direction to swivel out of the respective cutout of the respective positioning device and to rotate on, and parallel to, a locating surface of the semifinished product and to extend along the locating surface of the semifinished product and such that the retaining device is rotatable about the pivot point in a second direction that is opposite to the first direction to collapse into the respective cutout of the respective positioning device.

8. The method according to claim 7, further comprising the act of:

using the transport device to transport the semifinished product.

9. The method according to claim 7, further comprising the act of:

for processing the semifinished product, introducing one or more locating elements of a processing device into respective engagement regions of the semifinished product, the one or more locating elements being configured to arrange the semifinished product relative to the processing device.

10. The method according to claim 9, further comprising the act of:

using the processing device to process the semifinished product.

* * * * *